United States Patent Office 2,966,874
Patented Jan. 3, 1961

2,966,874

COATING SHEET METAL CONTAINERS

Naaman F. Barr, Ross Township, Allegheny County, and Henry J. Bach, Mount Lebanon Township, Allegheny County, Pa., assignors, by mesne assignments, to American-Marietta Company, Stoner-Mudge Co. Division, Chicago, Ill., a corporation of Illinois No Drawing. Filed Jan. 27, 1956, Ser. No. 561,946

19 Claims. (Cl. 113—120)

This invention relates to the application of certain polyamine-polyepoxide resin compositions on seams of metal cans and the like, and using the heat incident to soldering the seams to cure the applied composition and to form a protective coating suitable for the interior as well as the exterior of side seams of containers for foods and beverages and the like.

The coating of soldered side seams of metal containers presents a difficult problem because of the unusual combination of special conditions, both physical and chemical, which must be met. Can bodies are customarily pre-coated before being formed into cylinders and soldered along their side seams. Since the coating applied to a can body side seam must be applied not only to a margin of bare metal along the soldered seam, but also over adjacent areas of the pre-coating along each side of the seam, it is necessary to prepare a seam coating composition which can be dissolved in solvents which will not have an adverse effect on the underlying pre-coating. Moreover, the side-seam coating composition must be capable of being applied to a seam before, during or immediately after the soldering operation (cf. Kronquest Patent 2,166,598 and Flugge 2,181,319), and of being cured by means of the soldering heat, without further application of heat. The system of using the soldering heat to cure the seam coating has important advantages of speed and efficiency, and avoids possible adverse effects on the soldered joint as a result of a subsequent high-temperature baking operation, but it severely limits the time available for the cure. For example, a conventional can line moves at a rate of about 400 cans a minute, each about 5 inches long, for example, and the side-seam soldering station is about 3 to 4 feet long, and is spaced about 15 to 20 feet from the next principal station (the unit which flanges the opposite annular edges of the can body), so that a can body passes through the soldering station in about one second, and from the soldering station to the flanger in less than 10 seconds. The curing time is especially limited when the side seam coating is applied immediately after the soldering operation. An additional problem is presented by the relatively high temperatures required for soldering.

Conventional coatings which have been tried for the purpose have been found to have serious disadvantages. Vinyl resins, such as the widely used vinyl chloride-vinyl acetate copolymers, generally lack adequate thermal stability when exposed to temperatures in the range of about 650° to 750° F., which is the range of temperatures usually employed for soldering seams. In addition, vinyl resins generally lack resistance to essential oils in foods and the like which may be packaged in the cans, and tend to deteriorate when used to line cans which are subsequently packed with food or the like and then heat processed. Among the other coatings tried for the purpose are oleoresinous coatings, but these coatings also lack resistance to some essential oils, have a tendency to impart flavor, and have poor flexibility when formulated to cure quickly at high temperatures.

We have discovered that these difficulties are overcome by dissolving a mixture of certain polyepoxide resins and polyamine resins in a volatile organic solvent or a mixture of such solvents, coating the resultant liquid composition, before the resins react substantially, on can body side seams, and using the heat imparted to the seam in the course of soldering to react the resins and drive off the solvents, thereby thermosetting the composition into a tough, adherent, flexible, chemical resistant, and continuous protective coating, which is essentially flavor-free, odorless and resistant to heat processing. The mixture of the polyepoxide resins and polyamine resins in accordance with the invention, although capable of curing quickly within the necessary range of high temperatures, reacts relatively slowly at room temperature, and consequently can be used within a sufficiently long period for practical purposes after the mixture is prepared. The side-seam coatings of the invention are particularly well suited to meet the exacting requirements of protective coatings for metal containers of foods, beverages and the like, including those which must be subjected to heat processing.

Polyepoxide resins are well known in the art, being polyethers containing recurring hydroxy groups and having terminal epoxide groups. The simplest of the polyether resins are the diglycidyl diethers of dihydric phenols, such as p,p' dihydroxy diphenyl 2-2' propane, or polyhydric alcohols, such as glycerine or pentaerythritol. The diglycidyl diethers of dihydric phenols have glycidyl radicals linked to the aromatic hydrocarbon radical by ethereal oxygen atoms. More generally, the polyether is of resinous character and contains two or more aromatic hydrocarbon radicals alternating with glyceryl groups which are connected therewith through ether oxygen atoms. Ordinarily, the polyether is a complex mixture of compounds rather than being a single particular compound. The principal product may be represented by the formula:

wherein $n$ is an integer of the series 0, 1, 2, 3 . . . and R represents the divalent hydrocarbon radical of the dihydric phenol. In a single molecule, $n$ is an integer. The polyether is a mixture of compounds, hence the determined value for $n$, from molecular weight measurement, is an average which is not necessarily zero or a whole number.

Any of the various dihydric phenols, or a mixture thereof, is used in preparing the polyethers, including mononuclear phenols such as resorcinol, catechol, hydroquinone, methyl resorcinol, etc.; or polynuclear phenols like p,p' dihydroxy diphenyl 2-2' propane [2,2'-bis (4 hydroxyphenol) propane (bis-phenol A)], 4,4'-dihydroxybenzophenone, bis (4-hydroxyphenyl) methane, 1,1'-bis (4-hydroxyphenyl) ethane, 1,1'-bis (4-hydroxyphenyl) isobutane, 2,2'-bis (4-hydroxyphenyl) butane, 2,2'-bis (4-hydroxy-2-methylphenyl) propane, 2,2'-bis (4-hydroxy-2-tertiarybutylphenyl) propane, 2,2'-bis (2-hydroxynaphthyl) pentane, 1,5-dihydroxynaphthalene, etc. The preferred phenol is p,p' dihydroxy diphenyl 2-2' propane.

The polyethers are prepared, in general, by heating at about 50° C. to 200° C. one or a mixture of dihydric phenols with epichlorohydrin, dichlorohydrin or mixtures thereof in a basic reaction medium. Depending upon the type of product desired, there is used from more than 1 to 2 or more mols of epichlorohydrin, for example, per mol of dihydric phenol. Also present is a base such as sodium, potassium, calcium, or barium hydroxide, generally in amount of about 5 to 30% stoichiometric excess of the epichlorohydrin, i.e., 1.05 to 1.3 equivalents of base per mol of epichlorohydrin. In effecting the reaction, the dihydric phenol is mixed with an aqueous solution of the base and heated. The epichlorohydrin is then added rapidly to the stirred reaction mass. The initial reaction is somewhat exothermic so that a temperature rise occurs to some extent. After addition of the epichlorohydrin, heat is applied for several hours, while stirring in order to complete the reaction. While still in a molten state, the formed polyether is washed with water until free of base.

The employed mol ratio of epichlorohydrin to dihydric phenol controls the molecular weight of the resulting polyether. By use of a substantial excess such as 3 to 10 mols of epichlorohydrin per mol of dihydric phenol, there is obtained as the predominant product, the simple diglycidyl diether of the dihydric phenol ($n$ equals or approaches zero). This polyether is best prepared by mixing the epichlorohydrin and dihydric phenol, heating and then adding about two equivalents of the base per mol of dihydric phenol at such a rate that the reaction mixture is about neutral during the whole time of the reaction. The length of the chain of the polyether (value of $n$) is increased by decreasing the mols of epichlorohydrin to dihydric phenol. Thus by decreasing the mols of epichlorohydrin per mol of dihydric phenol from about two downwards toward one, the molecular weight and the softening point are increased.

For purposes of the present invention it is essential that the average molecular weight of the polyepoxide resin component be in the range of about 600 to 2300. A preferred polyepoxide resin in accordance with the invention has a molecular weight of about 1000. The epoxide equivalency of the polyepoxide resin component for the purposes of the invention is in the range of about 300 to 1500, and preferably is about 450 to 525. Increasing the average molecular weight of the polyepoxide resin component substantially above 2300, and its epoxide equivalency substantially above 1500, adversely affects adhesion characteristics of the seam coating when it is subjected to steam processing, and reducing the average molecular weight substantially below 600, and the epoxide equivalency substantially below 300, reduces film flexibility and steam processing resistance of the seam coating.

The polyamine resin component of the composition of the invention is prepared by well known condensation reactions of one or more polymerized unsaturated fatty acids (dilinoleic acid being the preferred example) with one or more aliphatic polyamines (e.g., diethylene triamine, which is preferred, ethylene diamine, propylene diamine, and butylene diamine), and may be represented by the following general formula, in which R is $(CH_2)_x$, where $x$ is about 34, $n$ is in the range of about 3 to 10, and —NH—R'—NH— is a di- or higher amine radical, such as is present, for example, in ethylene diamine, propylene diamine, butylene diamine and diethylene triamine:

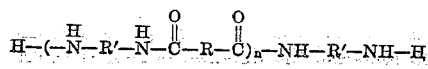

Polyamine resins useful for the purposes of the invention are those defined above which have average molecular weights of about 2000 to 6000, and amine equivalent values of about 200 to 800 as determined by titration with aqueous hydrochloric acid. The preferred polyamine resin for the purposes of the invention has an approximate molecular weight of 4500, and an amine equivalent value of about 500, as exemplified by "Versamid 100" of General Mills, Inc.

In the composition of the invention the polyepoxide resin component constitutes about 45 to 65% by weight of the composition, the balance being polyamine resin. Higher or lower proportions of polyepoxide resin outside of this range adversely affect the curing of the composition, which is evidenced by poor solvent resistance or tackiness or both.

The following table illustrates the effect on coating characteristics of the composition when the molecular weight of the polyepoxide resin component is varied. The polyamine resin component used in each case was "Versamid 100" (General Mills, Inc.), in a polyepoxide/polyamine resins weight ratio of 60/40.

TABLE I

*Effect of polyepoxide resin molecular weight*

|  | Epoxide A | Epoxide B | Epoxide C | Epoxide D | Epoxide E |
|---|---|---|---|---|---|
| (1) Approximate molecular weight | 550 | 1,000 | 2,000 | 3,000 | 6,000 |
| (2) Epoxide equivalent (gr. of resin containing one gr. equiv. of epoxide) | 225–290 | 450–525 | 870–1,025 | 1,550–2,000 | 2,400–4,000 |
| (3) Melting point of the polyepoxide resin (degrees centigrade) | 20–28 | 64–76 | 95–105 | 127–133 | 145–155 |
| (4) Stability of composition after initial mixture, in terms of days to gel | 1–2 | 4 | 6 | 12 | 13 |
| (5) Tackiness of baked coating (10 perfect; no tack) | 2 | 10 | 10 | 10 | 10 |
| (6) After steam processing 90 min. at 250° F.: | | | | | |
| (a) Film whitening (10 perfect; no whitening) | 4 | 9 | 9 | 9 | 9 |
| (b) Adhesion (10 perfect) | 10 | 10 | 8 | 5 | 2 |
| (7) Flexibility (30 perfect) | (tacky) | 22 | 22 | 22 | 22 |
| (8) Solvent resistance (10 perfect) | 0 | 8–9 | 8–9 | 6–7 | 5–6 |

The polyepoxide resins A, B, C, D and E of the foregoing Table I were commercial samples of "Epon 834," "Epon 1001," "Epon 1004," "Epon 1007" and "Epon 1009," respectively, of Shell Chemical Corp. Another polyepoxide resin having a molecular weight of about 1000 and suitable for the purposes of the invention is "Epi-Rez 520" of Jones-Dabney Co. (Devoe & Raynolds Co., Inc.). The tests reported in items 5–8 of the foregoing Table I were made on specimens of 0.25#/85# base weight electrolytic tinplate coated with the composition being tested at a coating weight of 3–4 mg./sq. in., without primer, and baked 10 min. at 250° F. This is a much longer and lower temperature bake than contemplated for the purposes of the invention, but it has been found to have the same curing effect, in the case of the Epoxide B composition, for example, as that obtained by use of heat incident to soldering at temperatures of 650° to 750° F. in a commercial production line, and is more readily controlled for comparative testing purposes in a laboratory. While this analogous laboratory comparison holds true for polyepoxide/polyamine resins, it may not be applicable to other kinds of compositions.

The flexibility test of Table I was made by forming the coated specimen into a 28 mm. screw cap, and observing the coating for discontinuity on the most severely drawn areas. This test affords an indication of the ability of the coating, when applied to a soldered side seam of a can body, to survive intact when the can body is flanged and beaded and the ends are double seamed on it. The solvent resistance test of Table I is made by repeatedly wiping the coated surface of the specimen with a pad saturated with monoethyl ether of ethylene glycol, and observing the coating for worn spots in the wiped area as the wiping is repeated.

The following Table II illustrates the effect on solvent resistance of the coating when the polyepoxide/polyamine resins weight ratio of the composition of the invention is varied. The compositions tested used "Epon 1001" as the polyepoxide resin component, and "Versamid 100" as the polyamine resin component, and were coated, baked and tested for solvent resistance as stated before for Table I.

TABLE II

*Effect of polyepoxide/polyamine resins weight ratio on solvent resistance*

| Polyepoxide/polyamine resins weight ratio | 30/70 | 45/55 | 55/45 | 65/35 | 70/30 |
|---|---|---|---|---|---|
| Solvent resistance (10 perfect) | 1-2 | 7-8 | 8-9 | 8-9 | 1-2 |

The following examples illustrate the preparation and use of specific examples of the composition of the invention for coating side seams of metal containers. All parts are by weight.

EXAMPLE I

A polyamine resin solution (solution I) was prepared consisting of 32.7 parts of a polyamine resin characterized by a molecular weight of about 4500, and an amine equivalent of about 500 ("Versamid 100" of General Mills, Inc.), dissolved in 63.3 parts of xylene and 4.0 parts of the ethyl ether of ethylene glycol. This solution had a No. 4 Ford Cup viscosity of 30 sec. at 80° F. and a weight per gallon of 7.4 pounds at 77° F. A second solution (solution II) composed of 37.7 parts of a polyepoxide resin characterized by a molecular weight of about 1000, a melting point of 64–67° C. and an epoxide equivalent of 450–525 (Epon 1001, Shell Chemical Corp.), was dissolved in 23.0 parts of butyl alcohol, 22.9 parts of hi-flash naphtha ("Solvesso 100" of Esso Standard Oil Co.) and 16.4 parts of xylene. This solution had a No. 4 Ford Cup viscosity of 12 sec. at 80° F. and a weight per gallon of 7.9 pounds at 77° F. Solutions I and II were blended 50–50 by volume just prior to use. The resulting solution, having a No. 4 Ford Cup viscosity of about 15 secs. at approximately 80° F., was spray applied to the hot soldered side seams on the inside of tinplate can bodies in a commercial can production line, immediately after soldering at a temperature of about 700° F. The coating cured completely within a period of 30 sec., using only the residual heat of soldering, and the results were satisfactory. Good spray characteristics, thermal stability, film flexibility, film toughness and other essential attributes for a seam coating in a can for foods and beverages were observed.

EXAMPLE II

A polyamine resin solution (solution III) was prepared consisting of 45 parts of "Versamid 100" dissolved in 11 parts of butyl alcohol and 44 parts of xylene. This solution had a No. 4 Ford Cup viscosity of 120 seconds at 80° F. and a weight per gallon of 7.6 pounds at 77° F.

A second solution (solution IV) composed of 45 parts of "Epon 1001," 27.5 parts of butyl alcohol, and 27.5 parts of hi-flash naphtha was prepared. This solution had a No. 4 Ford Cup viscosity of 20 sec. at 80° F., and a weight per gallon of 8.1 pounds at 77° F.

Solutions III and IV were blended 50–50 by weight and reduced to about 15 seconds No. 4 Ford Cup viscosity with xylene. The final solution was spray applied using commercial spray equipment to the hot soldered side seams of tinplate can bodies in a commercial can production line, immediately after soldering at about 700° F. The results were satisfactory. Cans thus manufactured were commercially test packed with a variety of food products and were observed to have excellent product resistance after periods of storage.

EXAMPLE III

A polyamine resin solution (solution V) was prepared consisting of 40.0 parts of "Versamid 100" dissolved in 48.0 parts of xylene and 12.0 parts of butyl alcohol. This solution had a No. 4 Ford Cup viscosity of 60 sec. at 80° F., and a weight per gallon of about 7.5 pounds at 77° F.

A second solution (solution VI) was prepared consisting of 32 parts of "Epon 1001," 8 parts of "Epon 1009," 32 parts of hi-flash naphtha, 22 parts of isophorone and 6 parts of butyl alcohol. The resulting solution had a No. 4 Ford Cup viscosity of 40 seconds and a weight per gallon of about 8.2 pounds at 77° F. The "Epon 1001" and "Epon 1009" polyepoxide resins (Shell Chemical Corp.) are characterized by molecular weights of about 1000 and 6000, respectively, and epoxide equivalent values of about 450–525 and 2400–4000, respectively, so that the polyepoxide resin component had an average molecular weight of about 2000, and an epoxide equivalent value of about 840–1020.

Solutions V and VI were blended 50–50 by weight just prior to use. The composition when applied and tested as stated above in connection with Table I, showed satisfactory characteristics, including excellent film toughness and resistance to steam processing.

EXAMPLE IV

A polyamine resin solution (solution V) was prepared consisting of 40.0 parts of "Versamid 100" dissolved in 48.0 parts of xylene and 12.0 parts of butyl alcohol. This solution had a No. 4 Ford Cup viscosity at 80° F. of 60 sec. and a weight per gallon of about 7.5 pounds at 77° F.

A second solution (solution VII) was prepared consisting of 40 parts of "Epon 1004," 32 parts of hi-flash naphtha, 22 parts of isophorone and 6 parts of butyl alcohol. The resulting solution had a No. 4 Ford Cup viscosity of 45 seconds and a weight per gallon of about 8.2 pounds at 77° F. "Epon 1004" polyepoxide (Shell Chemical Corp.) is characterized by an average molecular weight of about 2000, and an epoxide equivalence of about 870–1025.

Solutions V and VII were blended 50–50 by weight just prior to use. The composition when applied to commerical tinplate at a coating weight of 3–4 mg./sq. in. and baked 10' at 250° F. (equivalent in cure to the higher temperature, faster application of heat in a production line as stated in Example I), showed excellent film flexibility, toughness and resistance to steam processing.

The compositions of the above examples also produce satisfactory results when applied to can body seams in commercial can production lines before or during soldering as well as immediately after soldering, at soldering temperatures of about 650–750° F., and are likewise satisfactory when so applied on blackplate, for example, instead of tinplate.

Pigments, dyes, waxes and other non-reactants may be added to the composition of the invention for decorative purposes and the like, without otherwise materially affecting the significant characteristics of the composition. In addition, the composition of the invention may be modified with additives to enhance special properties.

While we have described present preferred embodiments of the invention and methods of practicing the same, it will be recognized that the invention is not limited thereto but may be otherwise variously embodied and practiced within the scope of the following claims.

We claim:

1. The process of making a container suitable for foods and beverages and the like, comprising the steps of soldering a seam in part of a metal container at a temperature of about 650 to 750° F., coating said seam with a composition consisting essentially of resins A and B dissolved in a volatile organic solvent, and containing about 45 to 65% by weight of resin A, the balance being resin B, resin A being a polyepoxide polyether resin having recurring hydroxy groups and terminal epoxide groups, an average molecular weight of about 600 to 2300, and an epoxide equivalent value of about 300 to 1500, and resin B being a polyamine resin formed by condensation reaction of a polymerized unsaturated fatty acid with an aliphatic polyamine and having an amine equivalence of about 200 to 800 as determined by titration with aqueous hydrochloric acid, and an average molecular weight of about 2000 to 6000, said resins A and B being substantially unreacted when the composition is initially coated on the seam, and utilizing the heat imparted to the seam during the soldering step to react resins A and B and thereby thermoset the composition.

2. The process of claim 1 in which the composition is applied to the seam before soldering.

3. The process of claim 1 in which the composition is applied to the seam during soldering.

4. The process of claim 1 in which the composition is applied to the seam immediately after soldering.

5. The process of claim 1 in which the container part being soldered is tinplate.

6. The process of claim 1 in which the container part being soldered is blackplate.

7. The process of claim 1 in which resin A is formed by the reaction of p,p' dihydroxy diphenyl 2-2' propane with epichlorohydrin.

8. The process of claim 1 in which resin A has an average molecular weight of about 1000, and an epoxide equivalent value of about 450 to 525.

9. The process of claim 1 in which resin B is formed by the reaction of dilinoleic acid with diethylene triamine.

10. The process of claim 9 in which resin B has an average molecular weight of about 4500, and an amine equivalent value of about 500.

11. The process of making a container suitable for foods and beverages and the like, comprising the steps of soldering a seam along the side of a cylindrical body of thin sheet metal at a temperature of about 650 to 750° F., coating said seam with a composition consisting essentially of resins A and B dissolved in a volatile organic solvent, and containing about 45 to 65% by weight of resin A, the balance being resin B, resin A being a polyepoxide polyether resin having recurring hydroxy groups and terminal epoxide groups and an average molecular weight of about 600 to 2300, and an epoxide equivalent value of about 300 to 1500, and being formed by the reaction of p,p' dihydroxy diphenyl 2-2' propane with epichlorohydrin, and resin B being a polyamine formed by condensation reaction of dilinoleic acid with diethylene triamine, and having an amine equivalent value of about 200 to 800 as determined by titration with aqueous hydrochloric acid, and an average molecular weight of about 2000 to 6000, said resins A and B being substantially unreacted when the composition is initially coated on the seam, and utilizing the heat imparted to the seam during the soldering step to react resins A and B and thereby thermoset the composition within less than 10 seconds.

12. The process of claim 11 in which the composition contains substantially equal parts by weight of resins A and B.

13. The process of claim 11 in which resin A has an average molecular weight of about 1000, and an epoxide equivalent value of about 450 to 525, and resin B has an average molecular weight of about 4500 and an amine equivalent value of about 500.

14. The process of claim 11 in which the composition is applied to the seam before soldering.

15. The process of claim 11 in which the composition is applied to the seam during soldering.

16. The process of claim 11 in which the composition is applied to the seam immediately after the soldering.

17. The process of claim 11 in which the container part being soldered is tinplate.

18. The process of claim 11 in which the container part being soldered is blackplate.

19. The process of claim 11 in which resin A has an average molecular weight of about 1000 and an epoxide equivalent value of about 450 to 525, resin B has an average molecular weight of about 4500 and an amine equivalent value of about 500, resins A and B are in substantially equal proportions by weight, and the part being soldered is tinplate.

References Cited in the file of this patent

UNITED STATES PATENTS

| | | |
|---|---|---|
| 1,622,533 | Murch | Mar. 29, 1927 |
| 2,181,319 | Flugge | Nov. 28, 1939 |
| 2,323,349 | Odquist | July 6, 1943 |
| 2,386,813 | O'Brien et al. | Oct. 16, 1945 |
| 2,455,785 | Larson | Dec. 7, 1948 |
| 2,769,826 | Yoho | Nov. 6, 1956 |
| 2,797,843 | Orlins | July 2, 1957 |
| 2,811,495 | Wittcoff et al. | Oct. 29, 1957 |